United States Patent

[11] 3,593,107

| [72] | Inventors | George E. Chilton<br>Haworth;<br>Karabet Simonyan, Saddle Brook, both of, N.J. |
|---|---|---|
| [21] | Appl. No. | 851,391 |
| [22] | Filed | Aug. 19, 1969 |
| [45] | Patented | July 13, 1971 |
| [73] | Assignee | Computer Diode Corporation<br>Fair Lawn, N.J. |

[54] HIGH VOLTAGE MULTIPLIER CIRCUIT EMPLOYING TAPERED MONOLITHIC CAPACITOR SECTIONS
12 Claims, 10 Drawing Figs.

[52] U.S. Cl. ............................................. 321/8 R,
317/249 R, 317/252, 317/256, 321/15
[51] Int. Cl. ............................................. H02m 7/00
[50] Field of Search ........................................ 317/249,
252, 256; 321/8, 15

[56] References Cited
UNITED STATES PATENTS

| 2,589,351 | 3/1952 | Ehrlich....................... | 317/249 |
| 3,123,760 | 3/1964 | Wouk et al. ................. | 317/256 X |

FOREIGN PATENTS

| 769,126 | 2/1957 | Great Britain................ | 321/15 |

Primary Examiner—William M. Shoop, Jr.
Attorney—Darby & Darby

ABSTRACT: A high voltage multiplier circuit employing an integrated assembly of diode junctions and a pair of multiple capacitor sections. Each capacitor section is formed from a single block of dielectric, and the individual capacitors are arranged with dielectric portions of varying thickness, the thickness being increased to accommodate the higher voltages applied to successive cascaded sections.

INVENTORS
GEORGE E. CHILTON
KARABET SIMONYAN

BY Darby & Darby

ATTORNEYS

HIGH VOLTAGE MULTIPLIER CIRCUIT EMPLOYING TAPERED MONOLITHIC CAPACITOR SECTIONS

This invention relates to miniature high voltage power supplies and in particular to devices providing voltage multiplication through the use of capacitors and diodes.

BACKGROUND OF THE INVENTION

A need exists for highly reliable, high voltage supplies, particularly those of small size. Such devices are used, for example, in X-ray devices and image intensifiers, and are generally for supply of pulsed power. In a voltage multiplier of the doubler type, each doubler stage subjects the following capacitor to a high stress, therefore requiring the use of successively higher rated capacitors, or the use of like capacitors capable of handling the higher voltage requirement in all locations. Generally, the latter wasteful procedure is followed because of cost and unavailability of standard capacitors in an adequate range of breakdown potentials.

The greater the capacitance of the capacitors, the higher the efficiency obtained from the device. In order to achieve high capacitance, either the capacitor plate area must be increased or the thickness of the interposed dielectric must be decreased. However, as the thickness of the dielectric decreases, its ability to withstand voltage stresses likewise decreases. Accordingly, to provide a higher efficiency multiplier a compromise between capacitance value and high voltage capability must be provided.

SUMMARY

There is disclosed below a capacitor structure for use in a voltage multiplier where a block of dielectric, such as barium titanate, is machined in the form of a tapered wedge, and independent capacitor plates are formed on opposite faces of the wedge forming a series of separate capacitors. Thus as one proceeds along the taper, the thickness of the dielectric between the plate increases. If the series of capacitors is then connected to the multiplier circuit, it will be appreciated that successive capacitors have increasingly thicker dielectric elements which permit the withstanding of the stresses of the successively higher voltages. This structure also permits protesting of the components before assembly and thereby providing a device that many be manufactured with a high rate of yield.

Accordingly, it is an object of this invention to provide an improved high voltage multiplier.

It is a further object of this invention to provide an improved miniature high voltage multiplier employing integral capacitors.

A still different object of this invention is to provide an improved multiple capacitor for use in high voltage multipliers.

A further object of this invention is to provide a high efficiency high voltage multiplier.

A particular object of this invention is to provide a high voltage multiplier employing a unitary multisection capacitor having low intersection coupling.

An additional object of this invention is to provide a monolithic high voltage multiplier employing a unitary multisection capacitor and integrated diode junctions.

Still a different object of this invention is to provide a high voltage multiplier which may be assembled with a minimum of interconnections.

A further object of this invention is to provide a highly reliable high voltage multiplier.

These and other objects, features and advantages of the invention will, in part, be pointed out with particularity and will, in part, become obvious from the following more detailed description of the invention taken in conjunction with the accompanying drawings which forms an integral part thereof.

DESCRIPTION OF A PREFERRED EMBODIMENT

Figure 1:
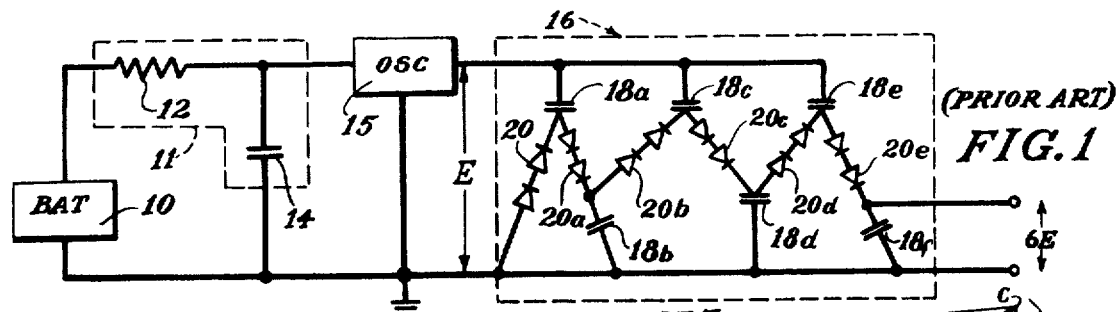
FIG. 1 is a circuit diagram of a power supply employing a parallel-type voltage multiplier circuit.

Referring now to the drawings in FIG. 1, there is shown as an example a typical, prior art, voltage multiplier power supply, comprising a source of power, such as a battery 10, an RC filter network 11 comprising a resistor 12 and a capacitor 14, and an oscillator 15 which feeds the diode-capacitor parallel-type voltage multiplier network 16.

It is to be understood that the present invention is equally adaptable to series-type multiplier circuits, including but not limited to voltage doublers, triplers, quadruplers, etc.

In the past, such devices have been assembled from discrete components, with the multiplier section 16 consisting of a number of capacitors 18 connected to the common junctions between succeeding diodes of a series diode string 20, 20a, 20b, etc. In FIG. 1 two junctions are shown in series for each diode by way of example.

Figures 2, 3:
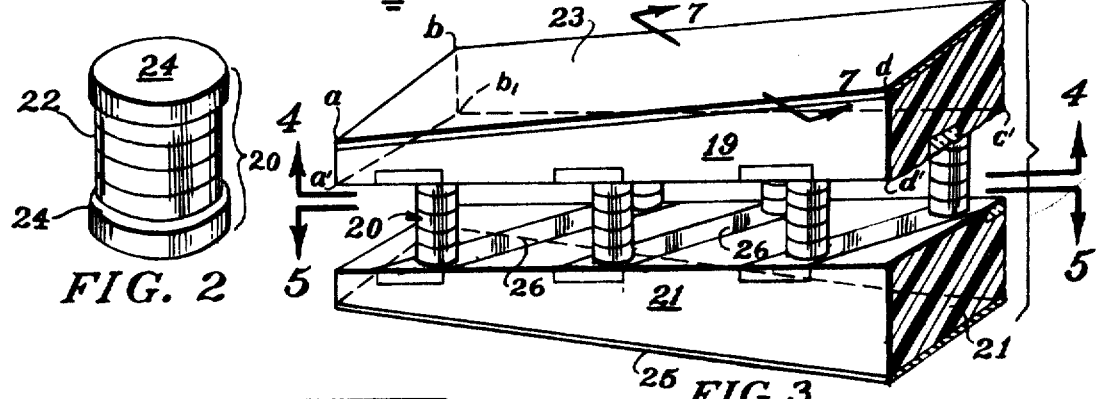
FIG. 2 is a perspective view of a multijunction diode stack.
FIG. 3 is a perspective view of a device embodying the invention.

For the purpose of this invention, it is preferred to employ the composite stack of semiconductor junctions shown in FIG. 2 in place of a series string of individual diodes. The stack is formed of semiconductor PN junction wafers 22 each having a substantially planar transverse end surface on either side of the junction therein. The wafers are joined together along their planar surfaces by a thin layer of electrically conductive metal. The wafers may be bonded together by heating the wafers in an oven using as the conductive metal a solder having a melting point below that of the wafer. The outer planar surfaces of the outermost wafers are bonded to conductive metal plates 24 for the purpose of making connection to the capacitors, as will be discussed hereinafter. The dimensions can be quite small; typically the height of a 4kv. unit stack containing multiple PN-junctions would be in the order of 0.040 inch to 0.050 inch, and a diameter in the range of 0.030 inch to 0.040 inch.

The voltage multiplication which appears across output capacitor 18f may be described as follows for simplicity:

Referring to FIG. 1, it will be seen that the oscillator 15 generates an alternating voltage E which when appearing positive on ground and negative on capacitor 18a for a half-cycle will cause capacitor 18a to charge through diodes 20 to the peak value of E. On the subsequent half-cycle the connection to ground becomes negative and the connection to capacitor 18a becomes positive. Capacitor 18a, having stored a voltage E across it on the first half-cycle does not permit diodes 20 to conduct. However, diodes 20a now conduct, passing both the voltage E from the oscillator and the voltage E from capacitor 18a, thereby charging capacitor 18b to a 2E potential. When the AC connection to ground becomes positive again, the voltage passes through diodes 20a and now through diodes 20b. This in turn will cause capacitor 18c to charge to a potential 3E through diodes 20b. Repeating the negative connection to ground and positive voltage connection to capacitor 18a will cause capacitor 18d to charge to a voltage 4E through diodes 20C. Continuing this process at a rapid rate which depends on the oscillator frequency, it is obvious that the output voltage, which in the present embodiment appears across capacitor 18F, will be equal to six times the peak value of the input E less, of course, the small forward voltage drops of the diodes. The capacitors once charged have no discharge path and can only help to increase the voltage on succeeding capacitors.

Obviously, any diode leakage (conduction in the reverse direction) will cause the charge across the capacitors to decrease somewhat. Stray capacitances, if of significant values, will also have adverse effects.

Figure 7:
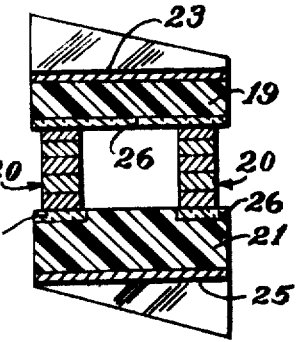
FIG. 7 is a sectional view taken along line 7-7 of FIG. 3.
Figure 5:
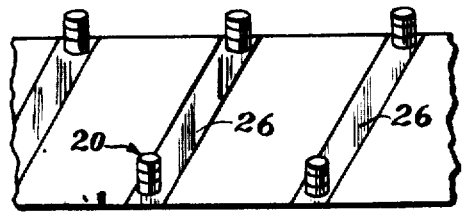
FIG. 5 is a plan view taken along line 5-5 of FIG. 3.

In the configuration, shown in FIG. 1, capacitor 18f is required to have a higher voltage breakdown rating than that of capacitor 18a. For convenience and cost limitations all capacitors usually are the same as the highest required rating. To overcome this restriction and to facilitate assembly, the preferred embodiment shown in FIGS. 3—7 and FIG. 10 may be employed. In this embodiment, a pair of dielectric elements 19, 21, such as barium titanate are shaped to have a double taper. That is to say, the dimension $a-a'$ is less than $b-b'$, and also less than $d-d'$; $b-b'$ and $d-d'$ are less than $c-c'$. It should be noted that the two dielectric members 19, 21 are essentially mirror images of each other. The backs (outer sides) of the elements 19, 21 are covered with layers of metal 23 and 25. The front of each is covered with metal strips 26. The metal layers 23, 25 and 26, may be deposited by any of the conventional plating or metallizing techniques, or formed in other ways, such as lamination. Each capacitor is then formed between one of the metal strips 26 and the cooperating common layer 23 or 25 as the case may be. Thus the capacitors at the right of the view have thicker dielectrics than those on the left. However, as seen in the sectional view of FIG. 7, the strips 27 are angled in relation to the taper of the dielectric blocks so that the thickness of the dielectric for a given capacitor is constant. The angle is chosen, so that the increase of dielectric thickness in the longitudinal direction ($a-a'$ to $d-d'$) is offset by the decrease of dielectric thickness in the transverse direction.

The device may be physically small. For example, a multiplier capable of producing 20,000 volts with a 1,000 -volt input would utilize a pair of barium titanate plates about one-half inch long and one-fourth inch wide and tapering from 0.020 inches to 0.080 inches from $a-a'$ to $d-d'$. In order to have a uniform thickness dielectric between the individual capacitor plates as has been described from $a-a'$ to $b-b'$, it is desirable to provide a second taper. The effect of this second taper is visible in FIGS. 6 and 7.

It should be recognized, however, that a single taper may also be provided while still practicing the present invention. With a single taper in the $a-a'$ to $d-d'$ direction of FIG. 3 each individual capacitor will have a nonconstant inter-plate distance. The strips 26 are angled in a similar fashion to make the interconnection pattern so that the dielectric thickness changes for the length of each strip when a single-tapered dielectric element is provided. This may prove difficult for calculating the desired capacitance from a design point of view; however, the value will be proportional to the average distance between the plates. With a single-tapered dielectric element the dielectric thickness for each capacitor must be selected for the narrowest portion to achieve maximum voltage breakdown capability.

Figure 4:
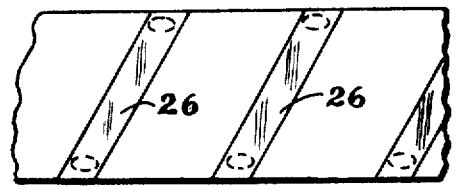
FIG. 4 is a plan view taken along line 4-4 of FIG. 3.
Figure 6:
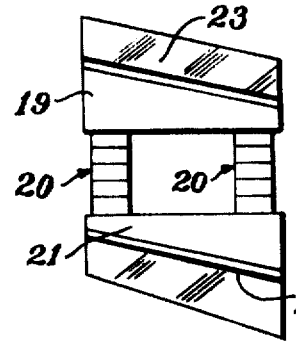
FIG. 6 is an end view of the device shown in FIG. 3.

The metal strips 26, forming the independent plates of the individual capacitors, are constructed to intersect the front surface of the capacitor sections at an acute angle. The bottom surface of the top section has a typical alignment of metal strips 26 as shown in FIG. 4. The top surface of the bottom section has metal strips aligned as in FIG. 5.

Figure 10:
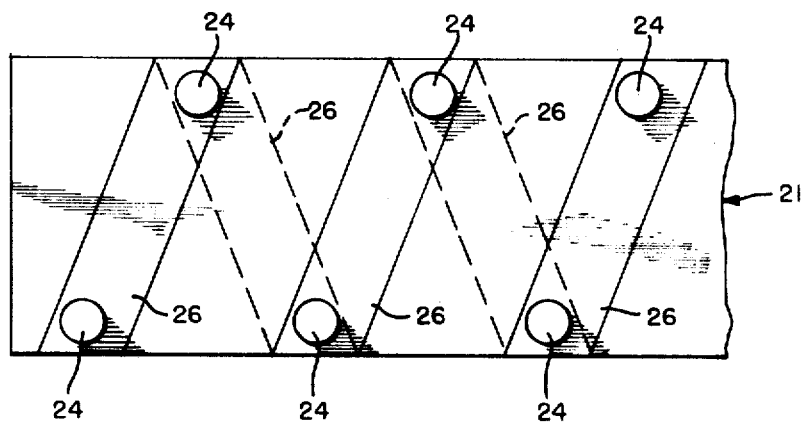
FIG. 10 is a plan view of the FIG. 3 or FIG. 8 embodiment showing the interconnection of the multiple capacitor sections.

Referring to the plan view of the assembly in FIG. 10, the zigzag nature of the interconnections is shown. The angled metal strips 26 forming a portion of the individual capacitors and the diodes 20, complete the necessary interconnections of the circuit of FIG. 1. Strips 26 may be secured to the end plates 24 of diodes 20 by soldering, welding or other suitable bonding method. Thus, the circuit has been reproduced with no additional wiring needed to affect connections, by merely physically arranging the diodes and capacitor sections. This results in a major improvement in circuit reliability and provides substantial cost savings resulting from reduced assembly time.

Figure 8:
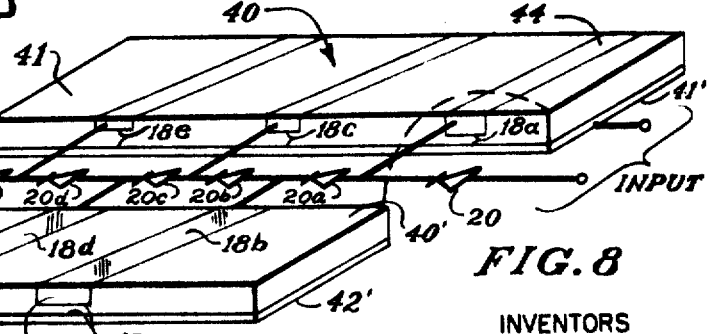
FIG. 8 is a showing, partly pictorial and partially schematic, of another embodiment of the voltage multiplier.

In FIG. 8 a still different approach is shown in which dielectric blocks 40, 40' have parallel faces 41, 41' and 42 and 42', respectively. The two capacitor sections are shown parted in booklike fashion to show their construction. Slots 43a, 43b and 43c in one face are respectively in as one proceeds from output to input. The metal strips are again angularly related in top and bottom sections to enable interconnection with no additional wiring as mentioned with regard to FIG. 3. The slots are filled with electrically conductive material 44 and the opposite face of the block covered with conductive layers 46, 47. A plurality of diodes 20 are connected in series with successive junctions connected to alternate ones of the capacitor block. The diodes are shown schematically in FIG. 8; however, it is understood that they may be inserted between the two sections as described in FIG. 3 to form an integral structure. It is to be noted that the thickness of the dielectric for successive capacitors increases from the input to the output of the multiplier circuit. The effect is the same as in FIG. 3, that is the latter stages of the multiplier have thicker dielectric and consequently higher breakdown voltages. This is accomplished by the technique of using the capacitor plates as interconnections.

Figure 9:
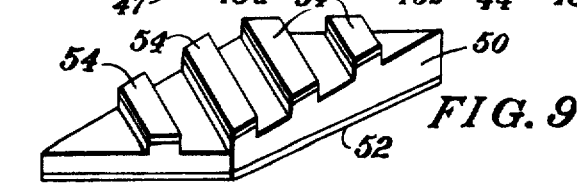
FIG. 9 is a perspective view of a preferred capacitor element for use in the voltage multiplier.

A presently preferred electrode plate is shown in FIG. 9 where a dielectric plate is shown milled to form conductive lands 54. The lands and back 52 are then metallized to form spaced electrodes. Alternatively, metal foil may be laminated to the opposed faces and then the grooves milled. This construction is preferred because the island type electrode have lower interelectrode capacitance since the metal surfaces present exceedingly small edge-to-edge areas which are spaced from each other by air rather than solid dielectric.

The composite assembly may where desired be encapsulated in an epoxy or glass material in the conventional manner with input and output leads or terminals provided to insure that the device is impervious to normally detrimental environmental conditions such as humidity and corrosive fluids.

It should be recognized that the approach of using capacitor plates as interconnection elements is not limited to multiplier circuits but may be used in any appropriate circuit requiring multiple capacitors which are connected to a common potential point. There is no apparent limitation to using any number of multisection capacitors in appropriate circuit configurations to effect a minimum number of connections.

There is additionally no reason to limit multisection capacitors having progressive voltage ratings to multipliers since it will be apparent to those skilled in the art that any appropriate circuit using capacitors of different voltage breakdown requirements may fall within the scope of the present invention.

Heretofore there has been disclosed a high voltage multiplier circuit employing a multiple capacitor and an integrated diode assembly suitable for use in applications where space is at a premium.

We claim:
1. A multiple capacitor comprising:
   a common first plate;
   a nonuniform thickness solid dielectric block, a first surface of said dielectric block being juxtaposed to said first plate; and
   a plurality of independent second plates juxtaposed to an opposite second surface of said dielectric block to form a plurality of capacitor sections, each section having a dielectric material of different thickness from every other section.

2. In combination with at least one multiple capacitor as described in claim 1, a voltage multiplier circuit adapted to have a source of AC power connected to the input thereof and a load supplied to the output thereof, comprising a plurality of rectifier elements connected to capacitor sections of said multiplier capacitor to form a plurality of cascaded voltage multiplier stages, wherein a successively thicker dielectric material appears between said common plate and said respective independent second plate for each successively cascaded multiplier stage.

3. A circuit as described in claim 2, wherein said rectifier elements are semiconductor diodes.

4. A circuit as described in claim 2, wherein each rectifier element comprises a stack of multiple diode junctions having each intermediate diode electrically and mechanically connected to an adjacent cathode and having the free end anode of the stack connected to a first metallic end plate and having the free end cathode connected to a second metallic end plate.

5. The multiple capacitor of claim 1 wherein said common first plate is metallic, and wherein said independent second plates are metallic and comprise isolated metal strip layers embedded in said second surface of said dielectric block.

6. The multiple capacitor of claim 5 wherein said two surfaces of said dielectric block are nonparallel and diverge in the longitudinal and transverse direction.

7. The multiple capacitor of claim 6 wherein said metal strip layers forming said independent second plates are arranged at an angle to the transverse orientation of said block to facilitate interconnection with other electronic elements and other similar multiple capacitor elements.

8. A voltage multiplier circuit, adapted to have a source of AC power connected to the input thereof and a load supplied to the output thereof, comprising:
   a first multiple capacitor section having a common first plate connected to said power source, a plurality of independent second plates and a variable thickness dielectric material interposed between said first and second plates;
   a second multiple capacitor section having a common first plate, a plurality of independent second plates and a variable thickness dielectric material interposed between said first and second plates; and
   a plurality of rectifier elements disposed between said sections for appropriately interconnecting independent plates of said capacitor sections in voltage multiplier fashion so that capacitor portions having successively thicker dielectric elements are provided for successively cascaded multiplier stages.

9. A circuit as described in claim 8, wherein said common plate of said second capacitor section is the circuit common, the anode of a first rectifier element is connected to circuit common, the cathode of said first rectifier element is connected to the independent plate of a first capacitor of said first capacitor section and to the anode of a second rectifier element, the cathode of said second rectifier element is connected to the independent plate of a first capacitor of said second section and the anode of a third rectifier element, the cathode of said third rectifier element is connected to the independent plate of a second capacitor of said first section and the anode of a fourth rectifier element, the cathode of said fourth rectifier element is connected to the independent plate of a second capacitor of said second section.

10. A circuit as described in claim 9, wherein said independent plates of said first and second section are formed at opposite angles to each other so that interconnection between rectifier elements and capacitor elements is made without additional wiring.

11. A circuit as described in claim 10, wherein said plates are formed in dielectric material having parallel top and bottom surfaces, said common plate being juxtaposed to one surface and said independent metal strips being formed in the opposite surface in channels with increasingly thicker dielectric material between the independent strip and the common plate.

12. A circuit as described in claim 8, wherein said independent plates are formed on dielectric island strips and wherein a portion of the dielectric material between the plates is subject to side exposure.